July 25, 1944.    A. G. EVANS    2,354,250
TRACTOR-MOUNTED IMPLEMENT
Filed April 11, 1942
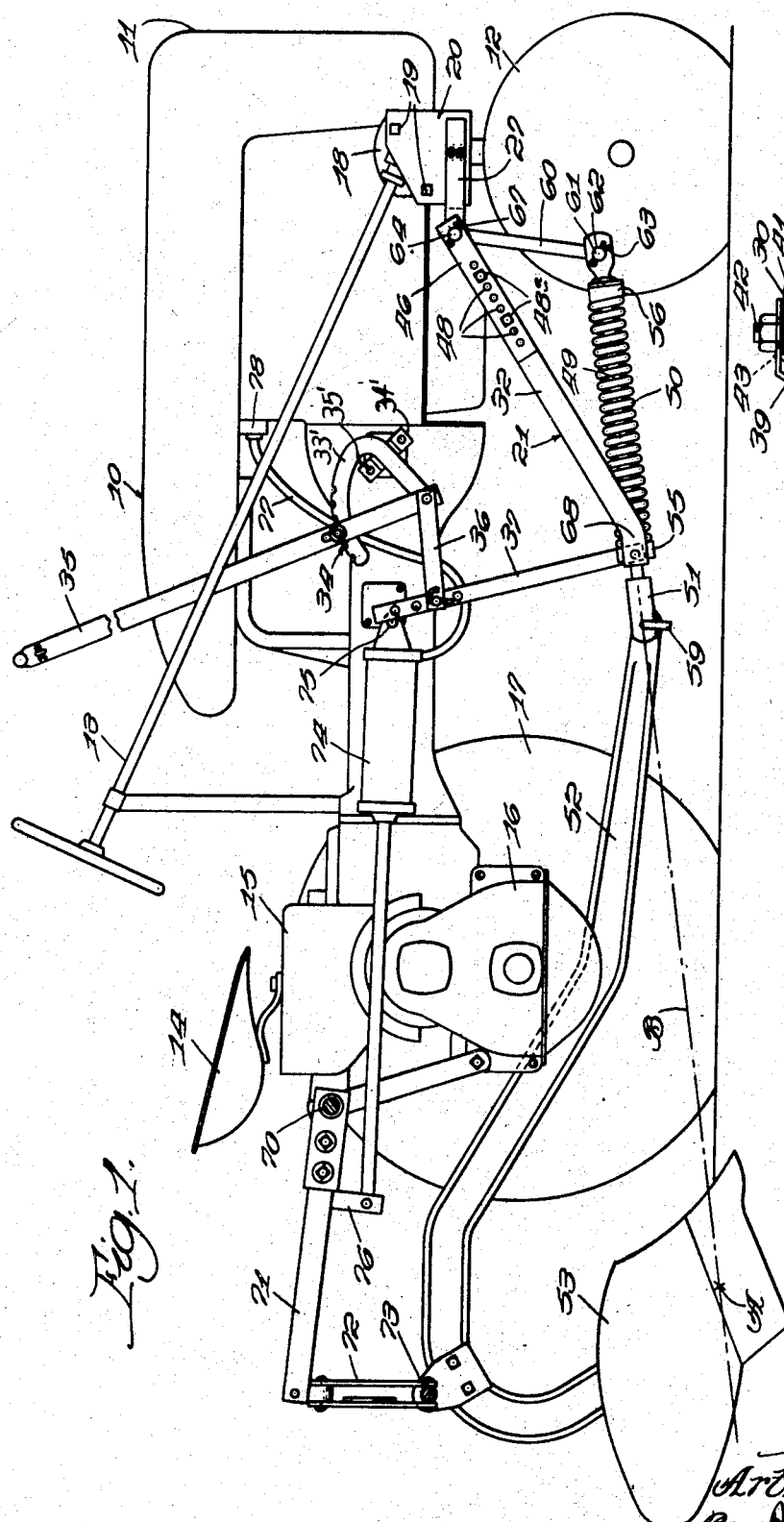
Inventor:
Arthur G. Evans.
By Paul O. Pippel
Atty.

Patented July 25, 1944

2,354,250

UNITED STATES PATENT OFFICE 2,354,250

TRACTOR-MOUNTED IMPLEMENT

Arthur G. Evans, Canton, Ill., assignor to International Harvester Company, a corporation of New Jersey Application April 11, 1942, Serial No. 438,579

2 Claims. (Cl. 97—47)

This invention relates to tractor-mounted implements and more particularly to cushioning spring hitch devices for the connecting of the working tools and their tool beams to the tractor or tool-supporting structure.

It is an object of the present invention to provide a simple and novel arrangement of a spring hitch device, wherein the hitch rod and compression spring, forming a part of that device, will lie in coaxial alinement with the line of draft from the center of pressure of the working tool through the point of connection of its tool beam with the hitch rod.

It is another object of the invention to provide a hitch device with its parts so arranged that it may be laterally adjusted to shift the hitch point such that a different width of cut of the ground being plowed may be taken.

For other objects and for a better understanding of the invention reference may be had to the following detailed description taken in connection with the accompanying drawing, in which:

Figure 1 is a side elevational view of a tractor with the implement embodying the spring hitch device attached thereto; and Figure 2 is an enlarged plan view of the cushioning spring hitch device and of its means for connecting the same to the tractor.

Referring now to the figures, there is shown a tractor or tool-supporting structure 10 having a forward portion 11 supported on the dirigible wheel 12 operable by a steering mechanism 13 accessible to an operator's station 14 on the rear portion 15 of the tractor. The rear portion 15 includes a depending axle structure 16 from which is driven a traction wheel 17.

On the forward portion 11 of the tractor is an attaching portion 18 adapted for the attachment of parts of working implements to the tractor. For the present this attaching portion serves as the means for the attaching of the cushioning spring hitch to the tractor. Rigidly secured to the attaching portion 18 by means of fastening bolts 19 is a connecting means 20 to which is connected a pull member 21. As viewed more clearly in Figure 2, it will be noted that this connecting means 20 has a vertically extending plate 22 with holes 23 in the same to accommodate the fastening bolts 19 serving to attach the same to the attaching portion 18 of the tractor. Connected to the rearward vertical edge of this plate as by welding, as indicated at 24, is a U-shaped strap member 25, the outer ends of which are respectively connected by means of converging straps 26 and 27 which are in turn connected to the forward end of the plate 20 by means of the welding materials 28 and 29. The outer ends of the U-shaped member 25 when joined with the respective straps 26 and 27 and weldingly held by the welding material 30 serves as means to which the pull member 21 is pivotally connected with respect to its connecting means and consequently with respect to the tractor.

The pull member 21 has a pair of laterally spaced longitudinally extending portions 31 and 32 connected together at their rearward end by a transverse portion 33. The pull member 21 is downwardly and rearwardly inclined and is supported in this rearward position by a manually adjustable means 34 connected to the tractor intermediate its forward and rearward portions and having an adjusting arm 35 accessible to the operator's station 14. Arm 35 is pivotally mounted upon a quadrant 33' welded to a bracket 34' which is affixed to the body of the tractor by bolts 35'. On the lower end of this adjusting arm 35 is a lifting arm 36 which is connected by means of a link 37 to a laterally extending pin 38 on the rearward end of the pull member. The forward end of the pull member, being pivotally attached to its connecting means 20 by means to be more clearly described, the member 21 can be raised and lowered by the operator when desired by manipulation of arm 35. The longitudinally extending portion 31 has a strap 39 on its forward end to provide a bifurcated portion 40 adapted to receive a rearwardly projected portion 41 of the connecting means 20. Through this rearwardly projected portion 41, there is an opening adapted to receive a pivot bolt 42. Likewise, through the bifurcated end 40 of the longitudinally extending portion 31 are openings 43 and 44 respectively of larger diameter than that of the pivot bolt 42. This enlarged diameter of the openings will permit a limited amount of lateral movement of the pull member 21.

The forward end of the longitudinally extending portion 32 has connected to it respectively on opposite sides thereof the straps 45 and 46 adapted to provide a bifurcated portion 47 thereon. These straps 45 and 46 have a series of holes 48 therein which may be alined with a series of holes in the portion 32. The straps are retained on the portion 32 by fastening bolts 48a which may be inserted through any one of a series of holes and the straps can extend different amounts beyond the end of the portion 32. By the provision of this means of connecting the straps, the pull member 21 may be laterally shifted underneath the tractor and is made to be retained in this laterally shifted position. This shifting of the pull member is made possible by the looseness provided in the openings 43 and 44 of the bifurcated portion 46 of the longitudinally extending portion 31.

Slidably connected to the transverse portion 33 or rearward end of the pull member 21 is a hitch rod 49 having a compression spring 50 thereon. This hitch rod has on its rearward end, and in rear of the transverse portion 30, a U-shaped member 51 adapted to receive between the same the forward end of a tool beam 52 which has on its rearward end a moldboard plow bottom or working-tool 53. This U-shaped member 51 is weldingly secured to the hitch rod, as indicated at 54, and forms a part thereof. This member also serves to prevent forward movement of the hitch rod through the transverse portion 33 of the pull member.

The compression spring 50 has on its respective ends evening pieces 55 and 56. The piece 55 is flush with the transverse portion 33 and is adapted to react thereagainst, while the piece 56 is retained against sliding movement on the hitch rod 49 by a washer 57 weldingly secured to the forward end of the hitch rod 49, as indicated at 58. This compression spring upon being attached to the pull member 21 is precompressed so that as the plow is being operated under normal plowing conditions, there will be a very slight pull of the hitch rod through the transverse portion 33.

Extending between a center of pressure point A somewhere on the moldboard plow bottom 53 and through a hitch point of the forward end of the plow beam 52 with the U-shaped member 51, as indicated by a removable hitch pin 59, is a line of draft B indicated by a dot and dash line.

In order to provide a more efficient cushioning spring device, the hitch rod 49 and its compression spring 50 are arranged to be in coaxial alinement with this line of draft B. The forward end of the hitch rod 49, which carries the forward end of the compression spring 50, is thus supported by a fore and aft swingable supporting link 60 having a transverse portion 61 on its lower end adapted to extend through an opening 62 in the forward end of the hitch rod 49 and to be retained therein by a cotter pin 63. The upper end of the supporting link 60 also has a transversely extended portion, as indicated at 64, which extends through an opening 65 in a rearwardly extending projection 66 of the connecting means 20. The transverse portion 64 of the supporting link 60 is retained in the opening 65 by a cotter pin 67. By having this supporting link 60 adapted for fore and aft movement, the hitch rod 49 is free to have longitudinal movement. It should also be apparent that this supporting link 60 by its transverse portion 64 serves as a means for the connecting of the bifurcated portion 47 of the longitudinally extending portion 32 to the connecting means 20, all of which serves to simplify the construction of the hitch device.

In order that the evening piece 55 of the spring 50 will be properly alined with the transverse portion 33 of the pull member, the rearward ends of the longitudinal portions 31 and 32 of the pull member 21 are bent upwardly as indicated at 68 in order to place a vertical face 69 of the transverse portiton 33 in a plane perpendicular to the line of draft B. It should also be apparent that the rearward end of the compression spring 50 and its piece 55 are well nested between the rear portions of the longitudinally extending portions 31 and 32 of the pull member 21.

By having the rearward end of the pull member 21 supported by the manually adjustable means 34, the hitch device may remain on the tractor even though the plow and its plow beam are disconnected from the same. It is also better to have the link 37 connected to the rearward end of the pull member 21 for supporting this hitch device than to have the same connected to the U-shaped member 51 of the hitch rod, wherein considerable rearward strain might be placed on the adjusting mechanism 34 as the compression spring 50 is compressed.

With a hitch device of this type the plow bottom 53 need not be provided with a break in its connection with the plow beam 52. The shock of striking an obstruction is readily taken up by the compression spring 50 and breakage of the plow or other of its parts is not apt to occur.

When it is desired to lift the plow 53 out of its ground-working position, the same is effected by a lifting arrangement common to tractors having direct-connected implements connected to the same. The present lifting means includes a lifting rock-shaft 70 having a rearwardly extending arm 71 connected by means of a depending link 72 to the rear end of the plow beam 52, as indicated at 73. With plows of this type the rock-shaft 70 usually includes a second arm laterally spaced and similarly connected to the rearward end of the plow beam 52. The plow beam is thus in this manner stabilized with respect to the tractor. The power for lifting or rocking the rock-shaft 70 is supplied by a fluid cylinder device 74 connected to the tractor, as indicated at 75 to react thereagainst and to a projection 76 on the arm 71. An extension of the fluid-actuated device 74 will lift the arm 71 upwardly taking with it the plow beam 52 and its plow bottom 53. Fluid is supplied to the fluid-actuated device 74 by a hose connection 77 adapted to receive fluid under pressure from a fluid source 78 on the tractor.

It should now be apparent that there has been provided a cushioning spring hitch device which is of simple construction and wherein the hitch rod and its compression spring are arranged to be most effective by having the same in coaxial alinement with the line of draft extending between the center of pressure of the plow bottom and the connection of its beam with the hitch rod. It should also be apparent that this hitch device in addition to being simple in construction is also provided with means for giving the same vertical and lateral adjustment in order to properly aline the plow bottom in its ground-working position.

While various changes may be made in the detail construction, it shall be understood that such changes shall be within the spirit and scope of the present invention as defined by the appended claims.

What is claimed is:

1. In combination, a tool-supporting structure, a working-tool structure adapted to be connected to the tool-supporting structure and including a working tool, a longitudinally extending beam for the working tool, and a cushioning spring hitch device for connecting the tool beam to the tool-supporting structure, said cushioning spring hitch device including a pull member adjustable in length having forward and rearward end portions, a hitch rod extending through the rearward end of the pull member, a compression spring member adapted to react against the rearward end of the pull member and connected to the hitch rod, means for connecting the forward end portion of the pull member to the tool-supporting structure including a fore and aft pivotable link, and said hitch rod supported at its forward end on the pivotable link, said link supporting said hitch rod and compression spring in a position substantially in coaxial alinement with the line of draft of the working tool through the hitch point of its beam, whereby said pivotal link serves simultaneously to connect the pull member to the tool-supporting structure and to support the hitch rod for free longitudinal movement.

2. In combination, a tool-supporting structure, a working-tool structure adapted to be connected to the tool-supporting structure and including a working tool, a longitudinally extending tool beam for the working tool, a cushioning spring hitch device for connecting the tool beam to the tool-supporting structure, said cushioning spring hitch device including a pull member having a pair of laterally spaced longitudinally extending portions adapted to extend generally at one inclination with respect to the line of draft of the working tool through its hitch point of the beam with the hitch device, and a closed portion for connecting the rearward ends of the spaced portions together, the rearward ends of said spaced portions bent upwardly to another inclination and into alinement with the line of draft to thereby dispose the closed portion at right angles therewith, a hitch rod extending through the closed portion, a compression spring on the hitch rod, nested between the longitudinally extending spaced portions of the pull member, and adapted to react against the closed portion of the pull member, means for supporting the forward ends of the hitch rod and spring for free longitudinal movement and in coaxial alinement with the line of draft, whereby said compression spring will react flat against the closed portion of the pull member said last mentioned means comprising a depending link pivoted adjacent the point of connection of said pull member to said support, and means for pivotally connecting the forward end of said hitch rod to the lower end of said link.

ARTHUR G. EVANS.